US012720418B2

(12) United States Patent
Nayak et al.

(10) Patent No.: US 12,720,418 B2
(45) Date of Patent: Aug. 25, 2026

(54) METHOD AND APPARATUS FOR EMERGENCY PREPAREDNESS COMMUNICATION SERVICES

(71) Applicant: Samsung Electronics Co., Ltd., Suwon-si (KR)

(72) Inventors: Peshal Nayak, Plano, TX (US); Vishnu Vardhan Ratnam, Plano, TX (US); Boon Loong Ng, Plano, TX (US); Rubayet Shafin, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 393 days.

(21) Appl. No.: 18/339,175

(22) Filed: Jun. 21, 2023

(65) Prior Publication Data

US 2024/0007933 A1 Jan. 4, 2024

Related U.S. Application Data

(60) Provisional application No. 63/358,010, filed on Jul. 1, 2022.

(51) Int. Cl.
*H04W 4/00* (2018.01)
*H04W 4/90* (2018.01)
*H04W 48/12* (2009.01)

(52) U.S. Cl.
CPC ............. *H04W 48/12* (2013.01); *H04W 4/90* (2018.02)

(58) Field of Classification Search
CPC ....... H04W 48/12; H04W 4/90; H04W 76/50; H04W 52/0216; H04W 74/0816; H04W 84/12
See application file for complete search history.

(56) References Cited

U.S. PATENT DOCUMENTS

| | | | |
|---|---|---|---|
| 10,524,269 | B2 | 12/2019 | Cariou et al. |
| 2012/0136923 | A1 | 5/2012 | Grube |

(Continued)

FOREIGN PATENT DOCUMENTS

| | | | |
|---|---|---|---|
| EP | 3554173 | A1 | 10/2019 |
| KR | 10-2015-0035162 | A | 4/2015 |
| WO | 2022066881 | A1 | 3/2022 |

OTHER PUBLICATIONS

IEEE P802.11be—D2.0 “Draft Standard for Information technology—Telecommunications and information exchange between systems Local and metropolitan area networks—Specific requirements; Part 11: Wireless LAN Medium Access Control (MAC) and Physical Layer (PHY) Specifications—Amendment 8: Enhancements for extremely high throughput (EHT)” May 2022, 873 pages.

(Continued)

*Primary Examiner* — Omoniyi Obayanju

(57) ABSTRACT

A method includes detecting, at an access point (AP), that a station (STA) is in an emergency preparedness communication services (EPCS) mode. The method also includes, responsive to detecting that the STA is in the EPCS mode, transmitting a beacon frame to another AP, wherein the beacon frame includes a first information element (IE) indicating that EPCS is activated for the STA and wherein the beacon frame indicates for the other AP to turn off overlapping basic service set preamble detection (OBSS/PD). The method further includes transmitting EPCS data to the STA while the other AP has OBSS/PD turned off.

18 Claims, 10 Drawing Sheets

(56) References Cited

U.S. PATENT DOCUMENTS

| | | | | |
|---|---|---|---|---|
| 2015/0095943 | A1 | 4/2015 | Lee et al. | |
| 2017/0311166 | A1 | 10/2017 | Li et al. | |
| 2018/0124584 | A1 | 5/2018 | Venkatraman et al. | |
| 2021/0144778 | A1* | 5/2021 | Cherian | H04W 12/08 |
| 2023/0119901 | A1* | 4/2023 | Viger | H04W 76/15 370/329 |

OTHER PUBLICATIONS

IEEE P802.11be™/D1.4, "Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT)", Jan. 2022, 787 pages.

Partial Extended European Search Report issued Mar. 26, 2025 regarding Application No. 23831855.4, 11 pages.

International Search Report and Written Opinion issued Sep. 22, 2023 regarding International Application No. PCT/KR2023/008904, 9 pages.

Chen, "An Energy-Efficient Channel Access With Target Wake Time Scheduling for Overlapping 802.11ax Basic Service Sets", IEEE Internet of Things Journal, vol. 9, No. 19, Mar. 2022, pp. 18973-18986.

* cited by examiner

METHOD AND APPARATUS FOR EMERGENCY PREPAREDNESS COMMUNICATION SERVICES

CROSS-REFERENCE TO RELATED APPLICATION AND CLAIM OF PRIORITY

This application claims priority under 35 U.S.C. § 119(e) to U.S. Provisional Patent Application No. 63/358,010 filed on Jul. 1, 2022, which is hereby incorporated by reference in its entirety.

TECHNICAL FIELD

This disclosure relates generally to wireless communications systems. Embodiments of this disclosure relate to methods and apparatuses for emergency preparedness communication services.

BACKGROUND

Emergency telecommunication services (such as those specified in International Telecommunications Union's ITU-T E.107) have been implemented in a number of countries with the objective of providing prioritized access in the times of disasters or emergencies. Examples of such telecommunication services in the United States include Government Emergency Telecommunication Service (GETS), Wireless Priority Service (WPS), Next Generation Network (NGN) Priority Services, and Telecommunications Service Priority (TSP). Such services have also been implemented in other countries, such as Blue Light Mobile Service in Belgium, Mobile Telecommunications Privileged Access Scheme in Great Britain, and Disaster Priority Telephone in Japan. Typically, such services are subscription based, operator controlled, enabled through global standards, and are offered over commercial network infrastructure.

SUMMARY

Embodiments of the present disclosure provide methods and apparatuses for emergency preparedness communication services.

In one embodiment, a method includes detecting, at an access point (AP), that a station (STA) is in an emergency preparedness communication services (EPCS) mode. The method also includes, responsive to detecting that the STA is in the EPCS mode, transmitting a beacon frame to another AP, wherein the beacon frame includes a first information element (IE) indicating that EPCS is activated for the STA and wherein the beacon frame indicates for the other AP to turn off overlapping basic service set preamble detection (OBSS/PD). The method further includes transmitting EPCS data to the STA while the other AP has OBSS/PD turned off.

In another embodiment, a device includes a transceiver and a processor operably connected to the transceiver. The processor is configured to: detect, at an AP, that a STA is in an EPCS mode; responsive to detecting that the STA is in the EPCS mode, control the transceiver to transmit a beacon frame to another AP, wherein the beacon frame includes a first IE indicating that EPCS is activated for the STA and wherein the beacon frame indicates for the other AP to turn off OBSS/PD; and control the transceiver to transmit EPCS data to the STA while the other AP has OBSS/PD turned off.

In another embodiment, a method includes receiving, at a first STA, an EPCS priority access enable request frame from a second STA, wherein the first STA and the second STA are configured to communicate over a P2P link. The method also includes transmitting, by the first STA, an EPCS priority access enable response frame to the second STA in response to the EPCS priority access enable request frame.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

Figure 1:
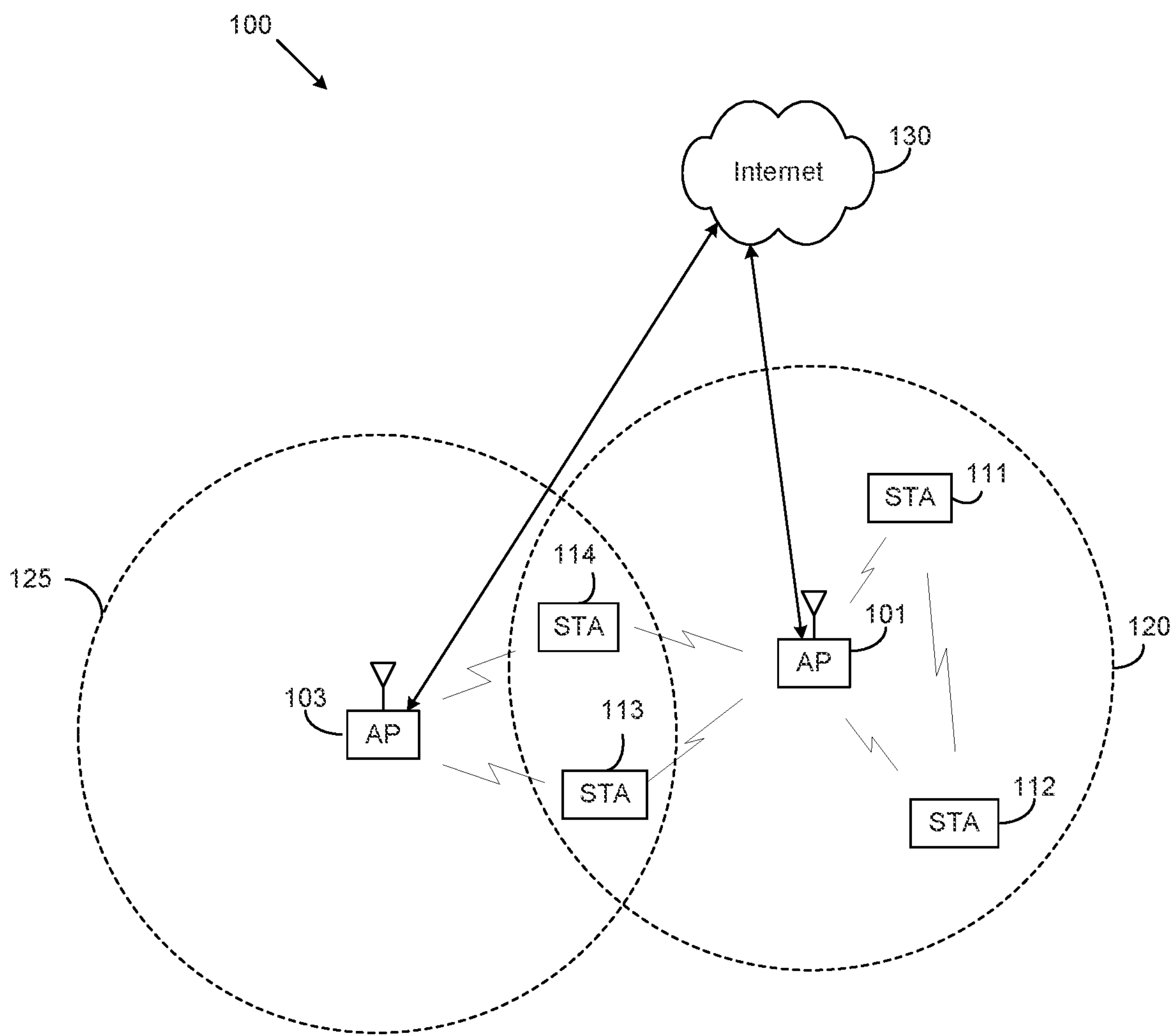
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using Wi-Fi or other WLAN communication techniques. The STAs 111-114 may communicate with each other using peer-to-peer protocols, such as Tunneled Direct Link Setup (TDLS).

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating emergency preparedness communication services. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101 and 103 could communicate directly with the network 130 and provide STAs with direct wireless broadband access to the network 130. Further, the APs 101 and/or 103 could provide access to other or additional external networks, such as external telephone networks or other types of data networks.

Figure 2A:
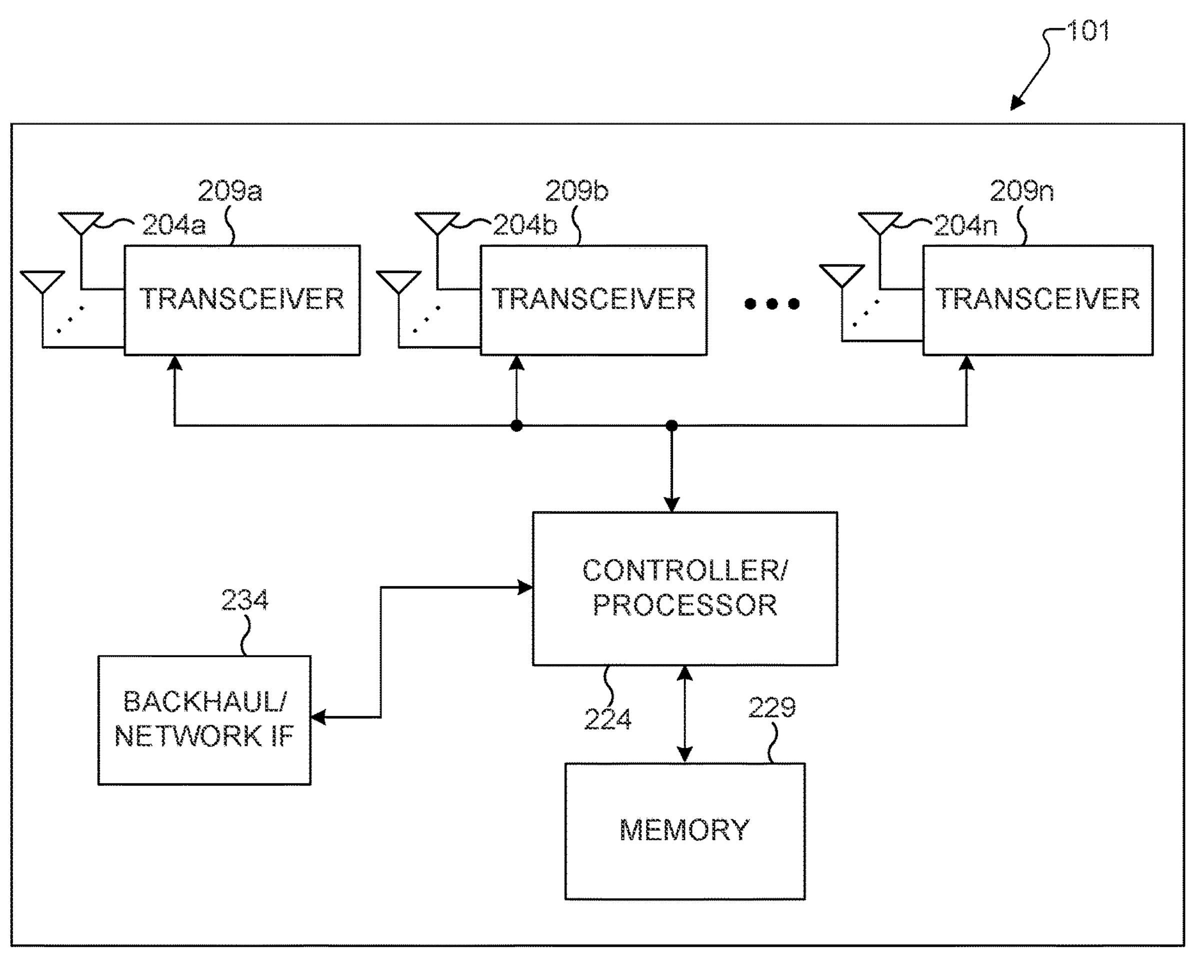
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204*a*-204*n* and multiple transceivers 209*a*-209*n*. The AP 101 also includes a controller/processor 224, a memory 229, and a backhaul or network interface 234. The transceivers 209*a*-209*n* receive, from the antennas 204*a*-204*n*, incoming radio frequency (RF) signals, such as signals transmitted by STAs 111-114 in the network 100. The transceivers 209*a*-209*n* down-convert the incoming RF signals to generate IF or baseband signals. The IF or baseband signals are processed by receive (RX) processing circuitry in the transceivers 209*a*-209*n* and/or controller/processor 224, which generates processed baseband signals by filtering, decoding, and/or digitizing the baseband or IF signals. The controller/processor 224 may further process the baseband signals.

Transmit (TX) processing circuitry in the transceivers 209*a*-209*n* and/or controller/processor 224 receives analog or digital data (such as voice data, web data, e-mail, or interactive video game data) from the controller/processor 224. The TX processing circuitry encodes, multiplexes, and/or digitizes the outgoing baseband data to generate processed baseband or IF signals. The transceivers 209*a*-209*n* up-converts the baseband or IF signals to RF signals that are transmitted via the antennas 204*a*-204*n*.

The controller/processor 224 can include one or more processors or other processing devices that control the overall operation of the AP 101. For example, the controller/processor 224 could control the reception of forward channel signals and the transmission of reverse channel signals by the transceivers 209*a*-209*n* in accordance with well-known principles. The controller/processor 224 could support additional functions as well, such as more advanced wireless communication functions. For instance, the controller/processor 224 could support beam forming or directional routing operations in which outgoing signals from multiple antennas 204*a*-204*n* are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including facilitating emergency preparedness communication services. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for facilitating emergency preparedness communication services. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. Alternatively, only one antenna and transceiver path may be included, such as in legacy APs. Also, various components in FIG. 2A could be combined, further subdivided, or omitted and additional components could be added according to particular needs.

Figure 2B:
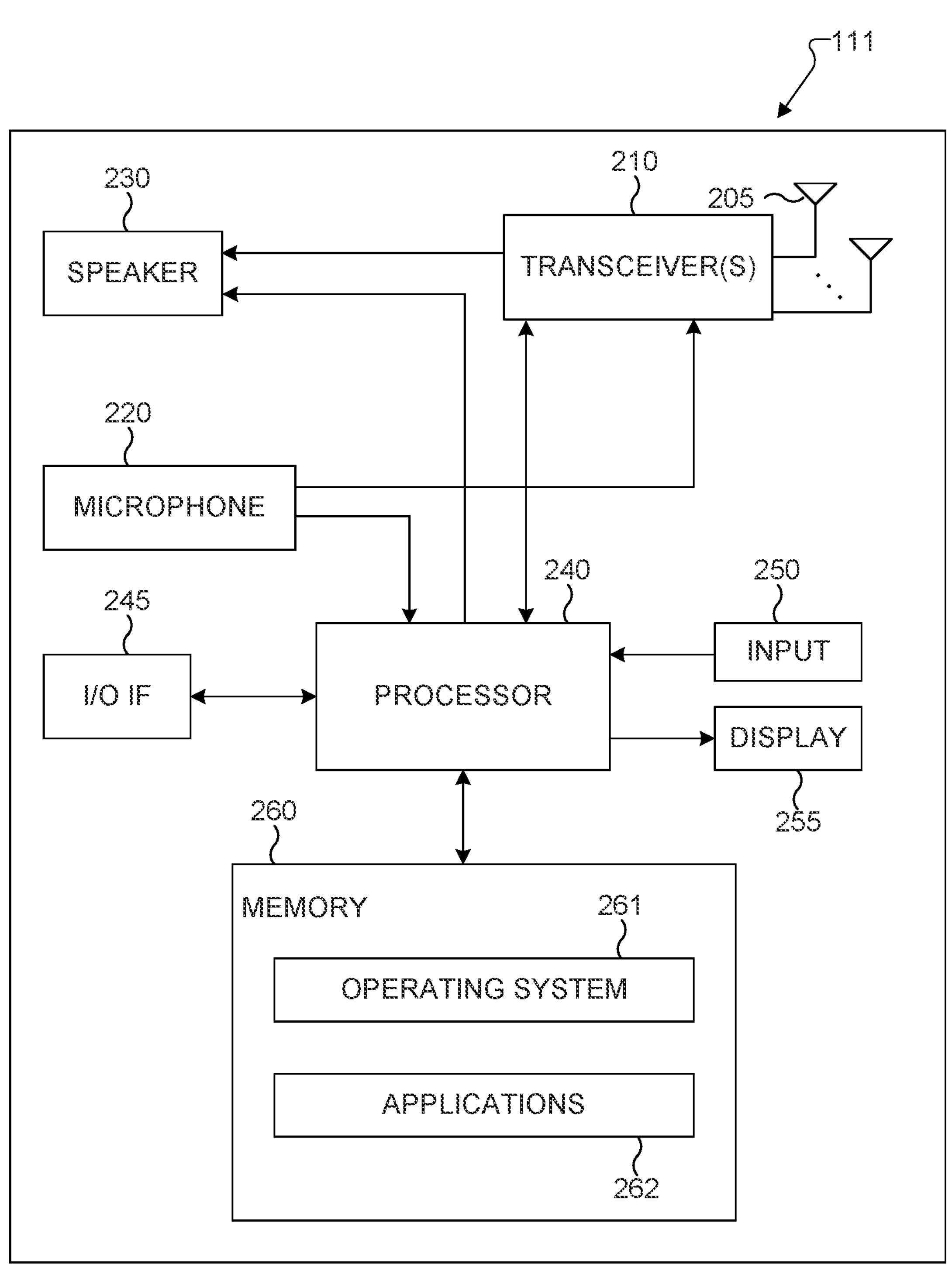
FIG. 2B illustrates an example STA according to various embodiments of the present disclosure.

FIG. 2B illustrates an example STA 111 according to various embodiments of the present disclosure. The embodiment of the STA 111 illustrated in FIG. 2B is for illustration only, and the STAs 112-114 of FIG. 1 could have the same or similar configuration. However, STAs come in a wide variety of configurations, and FIG. 2B does not limit the scope of this disclosure to any particular implementation of a STA.

The STA 111 includes antenna(s) 205, transceiver(s) 210, a microphone 220, a speaker 230, a processor 240, an input/output (I/O) interface (IF) 245, an input 250, a display 255, and a memory 260. The memory 260 includes an operating system (OS) 261 and one or more applications 262.

The transceiver(s) 210 receives from the antenna(s) 205, an incoming RF signal (e.g., transmitted by an AP 101 of the network 100). The transceiver(s) 210 down-converts the incoming RF signal to generate an intermediate frequency (IF) or baseband signal. The IF or baseband signal is processed by RX processing circuitry in the transceiver(s) 210 and/or processor 240, which generates a processed baseband signal by filtering, decoding, and/or digitizing the baseband or IF signal. The RX processing circuitry sends the processed baseband signal to the speaker 230 (such as for voice data) or is processed by the processor 240 (such as for web browsing data).

TX processing circuitry in the transceiver(s) 210 and/or processor 240 receives analog or digital voice data from the microphone 220 or other outgoing baseband data (such as web data, e-mail, or interactive video game data) from the processor 240. The TX processing circuitry encodes, multiplexes, and/or digitizes the outgoing baseband data to generate a processed baseband or IF signal. The transceiver(s) 210 up-converts the baseband or IF signal to an RF signal that is transmitted via the antenna(s) 205.

The processor 240 can include one or more processors and execute the basic OS program 261 stored in the memory 260 in order to control the overall operation of the STA 111. In one such operation, the processor 240 controls the reception of forward channel signals and the transmission of reverse channel signals by the transceiver(s) 210 in accordance with well-known principles. The processor 240 can also include processing circuitry configured to facilitate emergency preparedness communication services. In some embodiments, the processor 240 includes at least one microprocessor or microcontroller.

The processor 240 is also capable of executing other processes and programs resident in the memory 260, such as operations for emergency preparedness communication services. The processor 240 can move data into or out of the memory 260 as required by an executing process. In some embodiments, the processor 240 is configured to execute a plurality of applications 262, such as applications for emergency preparedness communication services. The processor 240 can operate the plurality of applications 262 based on the OS program 261 or in response to a signal received from an AP. The processor 240 is also coupled to the I/O interface 245, which provides STA 111 with the ability to connect to other devices such as laptop computers and handheld computers. The I/O interface 245 is the communication path between these accessories and the processor 240.

The processor 240 is also coupled to the input 250, which includes for example, a touchscreen, keypad, etc., and the display 255. The operator of the STA 111 can use the input 250 to enter data into the STA 111. The display 255 may be a liquid crystal display, light emitting diode display, or other display capable of rendering text and/or at least limited graphics, such as from web sites. The memory 260 is coupled to the processor 240. Part of the memory 260 could include a random-access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

As discussed above, emergency telecommunication services (such as those specified in ITU-T E.107) have been implemented in a number of countries with the objective of providing prioritized access in the times of disasters or emergencies. Examples of such telecommunication services in the United States include GETS, WPS, NGN Priority Services, and TSP. Such services have also been implemented in other countries, such as Blue Light Mobile Service in Belgium, Mobile Telecommunications Privileged Access Scheme in Great Britain, and Disaster Priority Telephone in Japan. Typically, such services are subscription based, operator controlled, enabled through global standards, and are offered over commercial network infrastructure.

In recent times, there has been a growing need for such services over Wi-Fi networks. In IEEE 802.11be, Emergency Preparedness Communication Services (EPCS) has been introduced with the goal of providing prioritized access to certain authorized users. As a part of this service, the user that has associated with an AP can be authorized by the AP to take advantage of EPCS service. Once authorized, the user can use enhanced contention related parameters, such as CWmin[AC], CWmax[AC], AIFSN[AC], TXOP[AC], and the like. With this enhanced EDCA parameter set, the non-AP multi-link device (MLD) that is authorized by the AP benefits from prioritized access as it can capture the channel faster compared to other users in the network. After EPCS is disabled, the non-AP MLD can update its EDCA parameter set to match that of other non-EPCS users in the network.

Despite the benefits in making EPCS available to Wi-Fi devices, there are a number of open issues associated with EPCS that impede efficient EPCS operation in next generation Wi-Fi networks. For example, consider the following scenario. An EPCS subscriber needs to use an application such as video conference. Cellular service in the subscriber's current location (e.g., a conference room) is poor or unavailable, so the subscriber uses a local enterprise's managed Wi-Fi access network for the application. As a result, the Wi-Fi becomes congested with competing traffic. Later, the subscriber invokes EPCS on the enterprise's Wi-Fi access network. The Wi-Fi enables priority access for the subscriber, and the subscriber obtains higher priority over other users in the network.

For EPCS in Wi-Fi, priority access to the channel is necessary. However, it is possible that the EPCS subscriber may experience interference from overlapping basic service set (OBSS) transmissions in the area. This can cause some degradation in the priority access operation, and device performance can suffer. Thus, there needs to be a harmonious co-existence of EPCS with other multi-BSS features, such as OBSS preamble detection (OBSS/PD). This would give protection to EPCS traffic in multi-BSS deployments. Also, harmonious co-existence of EPCS with features such as r-TWT, which are targeted towards latency sensitive traffic, is desirable.

In addition, there can be peer-to-peer (P2P) use cases involving EPCS devices. For the user to get benefit of EPCS capability, both devices involved in communication need EPCS priority access. If one of the devices is missing EPCS priority access, then the other device's EPCS authorization may not be of much value. Thus, a procedure by which one device can authorize the other device for EPCS is desirable.

Finally, there can be scenarios where a user can be in the vicinity of an AP that the user does not have authorization to connect to, but the user needs to run EPCS service on their device. AP side support for such scenarios is important.

To address these and other issues, this disclosure provides systems and methods for emergency preparedness communication services. As described in more detail below, the disclosed embodiments provide a spatial reuse based procedure that provides additional protection to EPCS traffic from OBSS transmissions. The disclosed embodiments also provide procedures by which a non-AP MLD can provide authorization to a peer non-AP MLD for EPCS operation. This includes procedures for an AP to provide EPCS access to a peer device, procedures for a non-AP MLD to authorize EPCS for a peer device, and procedures for an AP MLD to create a TWT schedule for a peer device. In addition, the disclosed embodiments provide procedures for an AP MLD to advertise support to allow devices whose users do not have the authorization (e.g., user name and password) to gain EPCS priority access support from the AP MLD.

Note that while some of the embodiments discussed below are described in the context of smart phones, these are merely examples. It will be understood that the principles of this disclosure may be implemented in any number of other suitable contexts or systems, including other portable electronic devices (e.g., tablets, laptops, and the like).

Figure 3A:
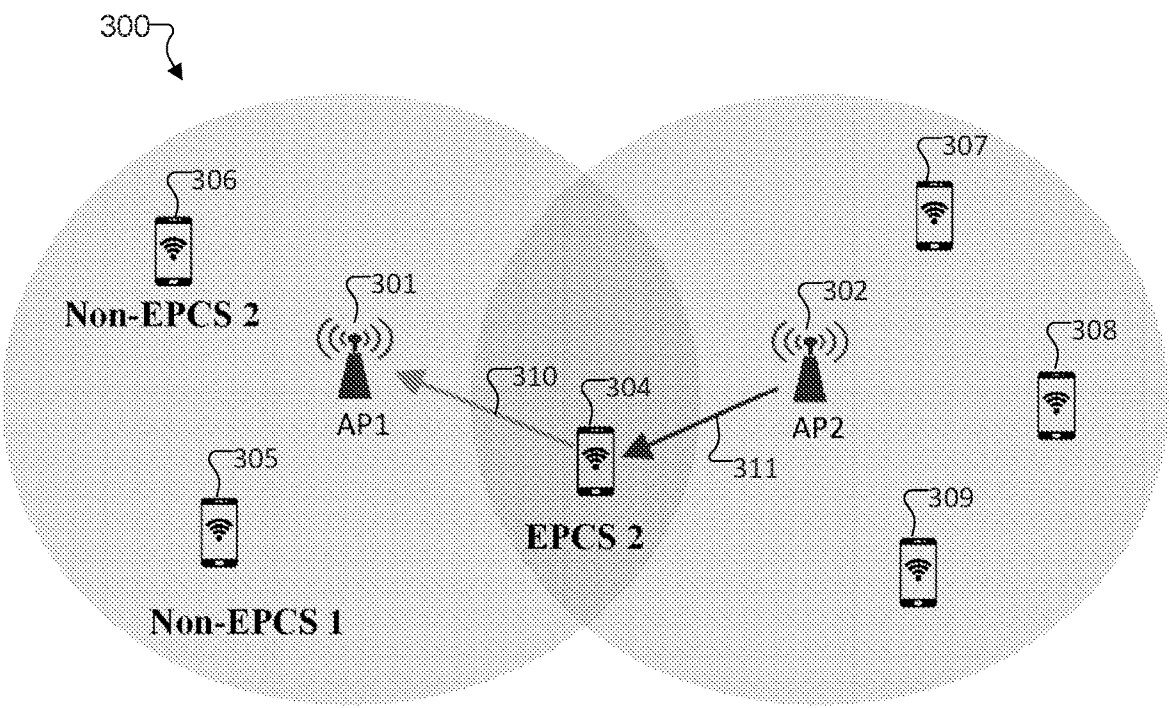
FIGS. 3A and 3B illustrate an example system in which EPCS devices are protected from OBSS interference according to various embodiments of the present disclosure.
Figure 3B:
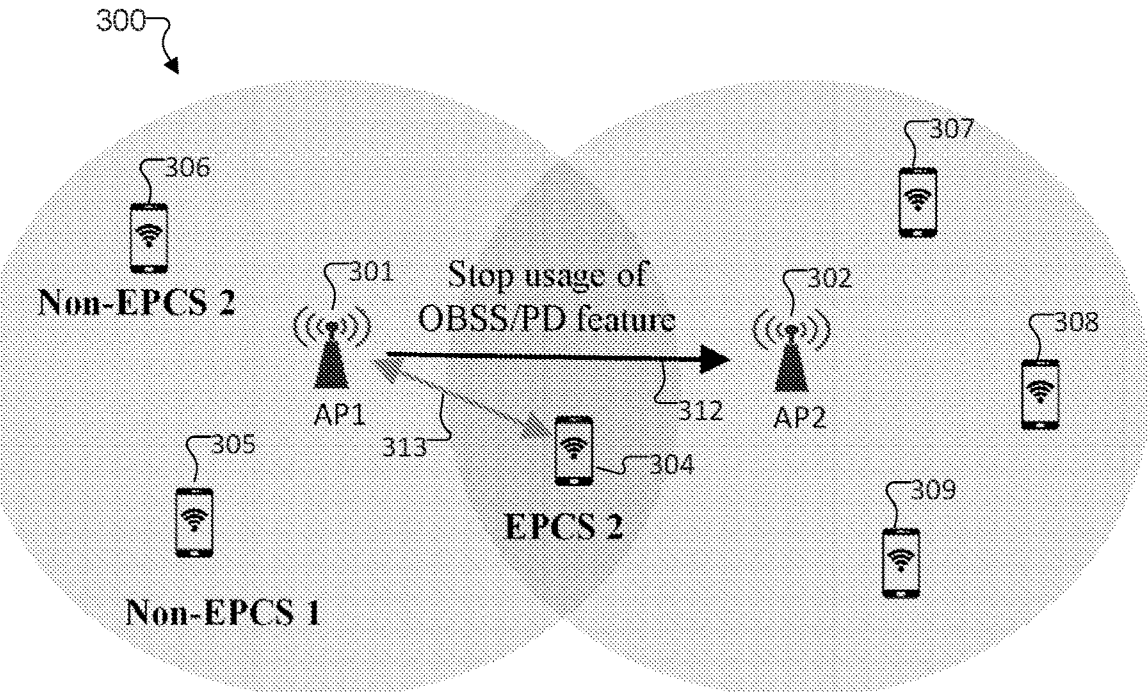

FIGS. 3A and 3B illustrate an example system 300 in which EPCS devices are protected from OBSS interference according to various embodiments of the present disclosure. As shown in FIGS. 3A and 3B, the system 300 includes a first AP 301 ("AP1") and a second AP 302 ("AP2"). Each AP 301 and 302 may represent (or be represented by) one of the APs 101 and 103 of FIG. 1. Various STAs 304-309 (e.g., smartphones, laptops, tablets, and the like) are positioned in the coverage areas of the APs 301 and 302. Each STA 304-309 may represent (or be represented by) one of the STAs 111-114 of FIG. 1. While the system 300 is shown as having two APs and six STAs, this is merely for ease of discussion. Other systems can include other numbers of APs and STAs. In some embodiments, some or all of the APs 301 and 302 and the STAs 304-309 can represent MLD devices.

As shown in FIG. 3A, the STA 304 has initiated EPCS priority access operation 310 with the AP 301. As known in the art, EPCS priority access is established at the MAC (medium access control) layer by the initiation of the SME (station management entity). While the EPCS priority access 310 is enabled, all traffic to and from the non-AP MLD (e.g., the STA 304) is handled with a higher priority. During the process of enabling EPCS priority access 310, the STA 304 updates its CWmin[AC], CWmax[AC], AIFSN[AC], and TXOP[AC] state variables to the values provided in the EDCA Parameter Set element for the corresponding AP in the EPCS Priority Access Enable Request Action frame or the EPCS Priority Access Enable Response Action frame.

While EPCS priority access 310 is enabled, the STA 304 operates by ignoring EDCA parameters that are sent by the AP 301 in its Beacon and Probe Response. Later, after the EPCS priority access 310 is disabled, the STA 304 updates its CWmin[AC], CWmax[AC], AIFSN[AC], and TXOP [AC] state variables again, such as to its pre-EPCS priority access values.

As shown in FIG. 3A, the STA 304 is within the coverage area of both the AP 301 and the AP 302. While the STA 304 is in EPCS priority access operation 310 with the AP 301, the STA 304 may experience interference 311 from the AP 302 due to overlapping basic service set preamble detection (OBSS/PD) at the AP 302.

In order to protect the STA 304 from the interference 311 due to OBSS/PD, the AP 301 can indicate to the AP 302 (and any other OBSS APs operating on the links on which EPCS users (e.g., the STA 304) operate) to stop the usage of the OBSS/PD feature for packets originating from its BSS. Stopping the OBSS/PD feature can provide additional protection from OBSS interference as the devices in OBSS will be more conservative in accessing the channel based on legacy interference thresholds.

Figure 4:
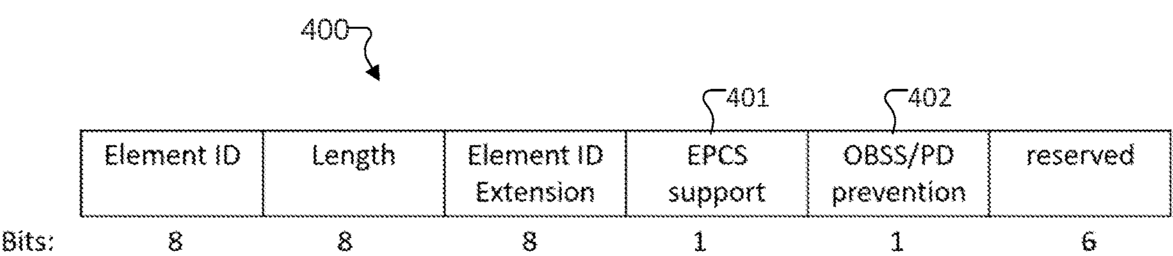
FIG. 4 illustrates an example format of an IE that can be carried in a transmitted frame for stopping the OBSS/PD feature on neighboring APs according to various embodiments of the present disclosure.

As shown in FIG. 3B, to indicate to the AP 302 to stop OBSS/PD usage, the AP 301 can transmit a beacon frame 312 that includes information indicating to stop OBSS/PD usage. For example, an information element (IE) carried in the beacon frame 312 can indicate to any AP that can hear the beacon (e.g., the AP 302) that the OBSS/PD feature needs to be stopped. Then, the AP 302 can transmit EPCS data 313 to the STA 304. FIG. 4 illustrates an example format of an IE 400 that can be carried in a transmitted frame for stopping the OBSS/PD feature on neighboring APs according to various embodiments of the present disclosure.

As shown in FIG. 4, the IE 400 includes an EPCS support field 401 that indicates that EPCS is activated for at least one associated STA (e.g., the STA 304), and an OBSS/PD prevention field 402 that indicates that the AP 301 wants neighboring APs to stop the OBSS/PD feature. In some embodiments, the EPCS support field 401 can be set to 1 when EPCS service is activated for at least one of the associated users, and can be set to 0 otherwise. The OBSS/PD prevention field 402 can be set to 1 if the AP 301 wants neighboring APs (e.g., the AP 302) to stop the OBSS/PD feature. Of course, these field names and representative values are merely examples; other names and values are possible and within the scope of this disclosure.

The IE 400 can be transmitted by the AP 301 in the beacon frame or any other suitable transmitted frame defined in the standard. In an example in which the above information element is transmitted in a beacon, any AP that hears a beacon containing the above information element can stop the OBSS/PD feature.

The AP 301 can also make an indication to stop the OBSS/PD feature via communication over the backhaul. In one embodiment, the SPATIAL_REUSE subfield in the HE-SIG-A field (if present) of the PPDUs transmitted to an EPCS enabled non-AP MLD (or transmitted by an EPCS enabled non-AP MLD on EPCS enabled links) can be set to PSR_AND_NON_SRG_OBSS_PD_PROHIBITED. When the SPATIAL_REUSE subfield is set to PSR_AND_NON_SRG_OBSS_PD_PROHIBITED, the following can be the behavior at the recipient (e.g., the AP 302 or another STA) that process such PPDUs. If the PHY layer of a recipient issues a PHY-CCA.indication(BUSY) followed by a PHY-RXSTART.indication primitive due to the PPDU reception, then the STA's MAC can update its basic NAV timer based on the PPDU instead of issuing a PHY-CCA-RESET.request primitive before the end of the PPDU. Thus, the recipient can set its NAV timer and defer to the ongoing transmission to and from an EPCS non-AP MLD.

As discussed above, there can be P2P use cases involving EPCS devices. For the user to get benefit of EPCS capability, both devices involved in communication need EPCS priority access. If one of the devices is missing EPCS priority access, then the other device's EPCS authorization may not be of much value. Thus, a procedure by which one device can authorize the other device for EPCS is desirable.

Figure 5:
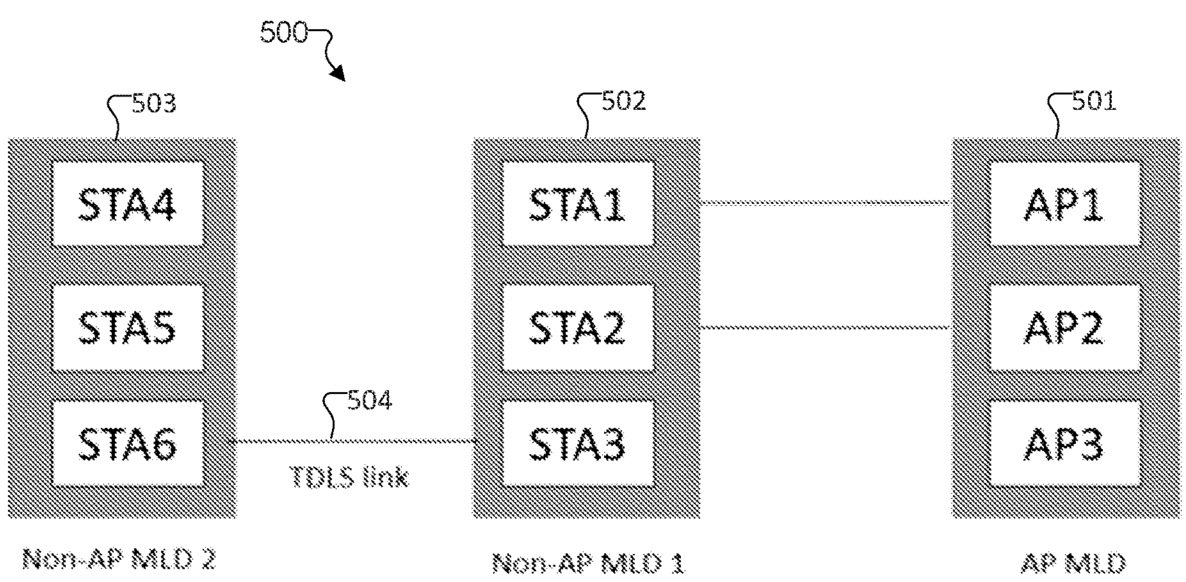
FIG. 5 illustrates an example system in which STAs are configured in a P2P configuration according to various embodiments of the present disclosure.

FIG. 5 illustrates an example system 500 in which STAs are configured in a P2P configuration according to various embodiments of the present disclosure. As shown in FIG. 5, the system includes an AP MLD 501 and two non-AP MLDs 502 and 503. The AP MLD 501 includes three affiliated APs: AP1, AP2, and AP3. The non-AP MLD 502 ("MLD 1") has three affiliated STAs: STA1, STA2 and STA3. The non-AP MLD 503 ("MLD 2") has three affiliated STAs: STA4, STA5, and STA6. Two of the STAs affiliated with the non-AP MLD 502, STA1 and STA2, have setup links with the AP MLD 501 and are configured to communicate with AP1 and AP2. The non-AP MLD 502 is authorized by the AP MLD 501 for EPCS access. Consequently, all traffic originating from the non-AP MLD 502 gets priority access.

In addition, STA3 (which is affiliated with non-AP MLD 502) and STA 6 (which is affiliated with non-AP MLD 503) are configured as peers and are configured to communicate with each other via a Tunneled Direct Link Setup (TDLS) link 504. Through TDLS operation, it is possible for two non-AP STAs to directly communicate with each other over a P2P link. TDLS is characterized by encapsulating setup frames in data frames, which allows the frames to be transmitted through an AP transparently. Therefore, the AP does not need to be direct-link capable, nor does the AP have to support the same set of capabilities that are used on the direct link between the two TDLS peer STAs. For example, if both peer STAs support more advanced capabilities than the AP, then the communication on the direct link can be at this higher level. As a particular example, if the AP only supports 802.11g and the two TDLS devices support 802.11n, then the devices can communicate at higher 802.11n data rates over the direct link. Several aspects of TDLS are specified in IEEE 802.11ax, including Discovery, Setup and Teardown, Channel switch, Power saving, Security, and the like.

The TDLS link 504 allows the AP MLD 501 to authorize EPCS access for the non-AP MLD 503. In some embodiments, when the non-AP MLD 502 is transmitting traffic received from the AP MLD 501 to the non-AP MLD 503, both the peers (i.e., the non-AP MLD 502 and the non-AP MLD 503) have to be authorized for EPCS in order to benefit from the enhanced EDCA parameter set obtained from the AP MLD 501. To achieve this, the priority access for the non-AP MLD 503 can be authorized by the AP MLD 501 itself. For example, the non-AP MLD 502 can transmit a frame to the non-AP MLD 503 to inform the non-AP MLD 503 that the non-AP MLD 503 has been authorized for EPCS access by the AP MLD 501. This frame can contain information as indicated in Table 1.

TABLE 1

| Field | Description |
|---|---|
| EPCS authorization provided | Provides an indication that non-AP MLD1 has been authorized for EPCS. In one embodiment, this can be a one bit field that is set to 1 when the non-AP MLD that transmits this field has been EPCS authorized by an AP MLD. |
| AP MLD indicator | Indicator that provides information on which AP MLD has authorized the non-AP MLD transmitting the field for EPCS priority access. In one embodiment, this can be the MAC address of the AP MLD. |

Figure 6:
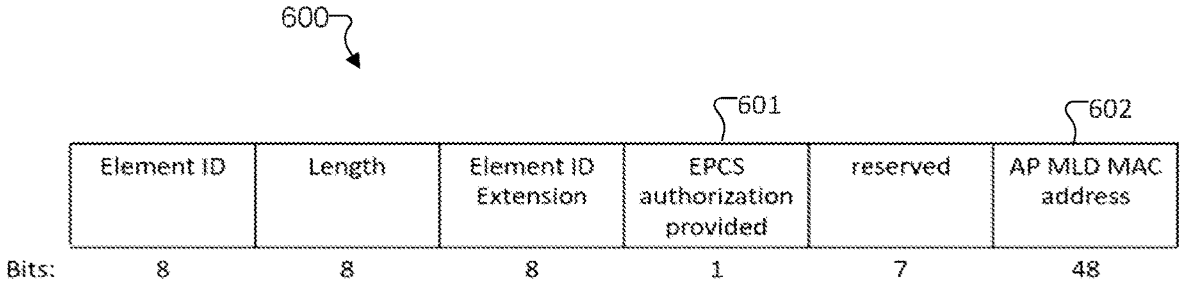
FIG. 6 illustrates an example format of an IE that can be included in a notification frame according to various embodiments of the present disclosure.

In some embodiments, the information in Table 1 can be in included in an IE. For example, FIG. 6 illustrates an example format of an IE 600 that can be included in a notification frame according to various embodiments of the present disclosure. As shown in FIG. 6, the IE 600 includes a one-bit EPCS Authorization Provided field 601 that can be set to 1 to indicate that the AP MLD 501 has provided authorization to the non-AP MLD 503. The IE 600 also includes an AP MLD MAC Address field 602 that can indicate to the AP MLD 501 that the non-AP MLD 503 should send the EPCS priority access enable request frame to receive EPCS operation parameters (e.g., an enhanced EDCA parameter set).

Figure 7:
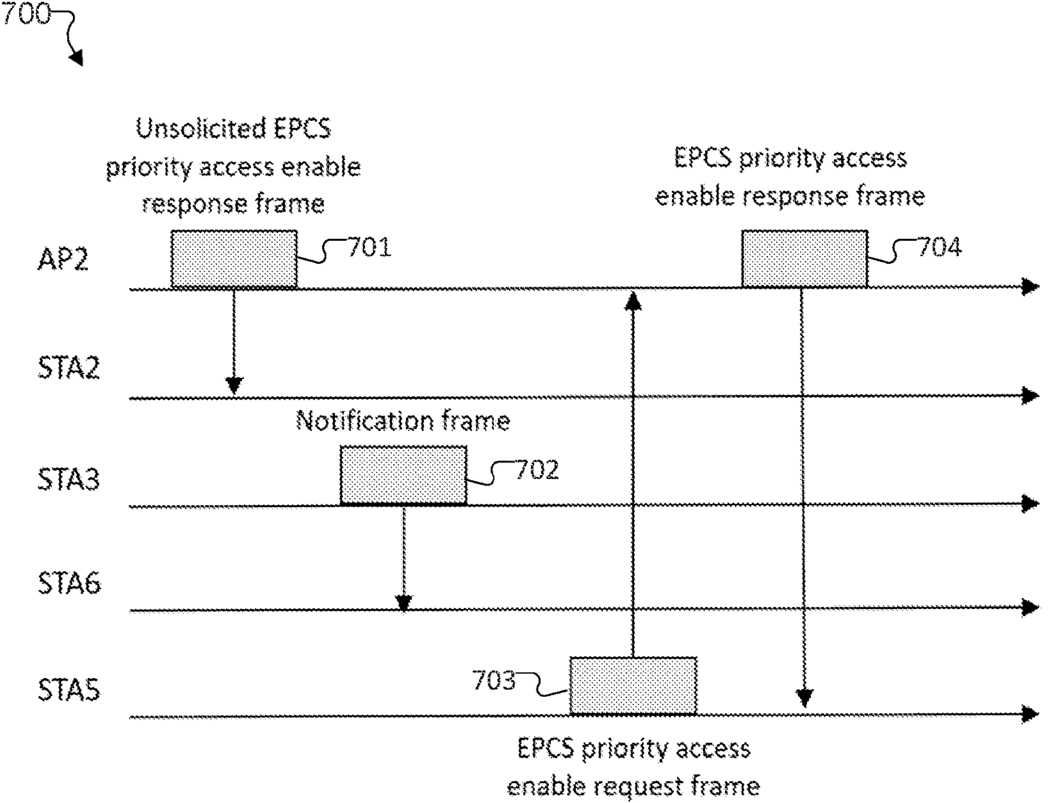
FIG. 7 illustrates a message flow diagram that shows an example of a notification procedure according to various embodiments of the present disclosure.

FIG. 7 illustrates a message flow diagram 700 that shows an example of the above notification procedure according to various embodiments of the present disclosure. As shown in FIG. 7, the AP2 (which is affiliated with the AP MLD 501) can transmit an unsolicited EPCS priority access enable response frame 701 to the STA2 (which is affiliated with the non-AP MLD 502). The frame 701 is shared with the STA 3 (which is also affiliated with the non-AP MLD 502). Upon receiving the frame 701, the STA3 can generate a notification frame 702 that includes an IE 600 and transmit the notification frame 702 to the STA6 (which is affiliated with the non-AP MLD 503) via the TDLS link 504.

Upon receiving the notification frame 702, the non-AP MLD 503 can transmit an EPCS priority access enable request frame 703 to the AP MLD 501, which is indicated in the notification frame 702. The EPCS priority access enable request frame 703 can contain additional fields to indicate the situation of the non-AP MLD 503, such as the additional fields shown in Table 2.

TABLE 2

| Field | Description |
|---|---|
| EPCS authorized non-AP MLD indicator | EPCS authorized non-AP MLD that non-AP MLD2 is communicating with. In one embodiment, this can be the MAC address of the EPCS authorized non-AP MLD. |
| Reason code | Reason for requesting EPCS access. E.g., A 4 bit value with one value to indicate that the request is being made for P2P communication with a EPCS authorized non-AP MLD. |

Upon receiving the EPCS priority access enable request frame 703, the AP MLD 501 can authorize the non-AP MLD 503 for EPCS access. That is, the non-AP MLD 503 can obtain EPCS authorization from the AP MILD 501 via its beacon and probe response frame. For example, the AP MLD 501 can transmit an EPCS priority access enable response frame 704 to the non-AP MLD 503. Following this, the non-AP MLD 503 can transmit a confirmation request to the non-AP MLD 502 containing information such as the fields indicated in Table 3.

TABLE 3

| Field | Description |
|---|---|
| EPCS authorization status | Provides an indication that non-AP MLD2 has been authorized for EPCS. In one embodiment, this can be a one bit field that is set to 1 when the non-AP MLD that transmits this field has been EPCS authorized by an AP MLD. |
| AP MLD indicator | Indicator that provides information on which AP MLD has authorized the non-AP MLD for EPCS priority access. In one embodiment, this can be the MAC address of the AP MLD. |

Upon completion of this setup, the non-AP MLD 503 can then use the EDCA parameter set that is obtained from the AP MLD 501 for P2P traffic transmitted to the non-AP MLD 502. The non-AP MLD 503 can use the EDCA parameter set to configure its channel contention procedure to use the enhanced contention parameters carried in the set.

Figure 8:
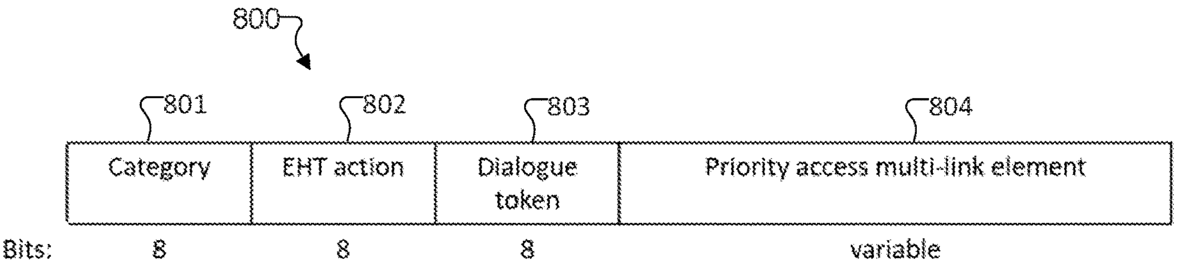
FIG. 8 illustrates an example EPCS priority access enable response frame according to various embodiments of the present disclosure.

In other embodiments, a non-AP MLD can authorize EPCS for a peer device. For example, if the non-AP MLD 503 is not authorized for EPCS access, the non-AP MLD 502 can provide authorization to the non-AP MLD 503. In order to perform this authorization, the non-AP MLD 502, after obtaining EPCS authorization from the AP MLD 501, can transmit an unsolicited EPCS priority access enable response frame to the non-AP MLD 503 after setup of the TDLS link 504 with the non-AP MLD 503. For example, FIG. 8 illustrates an example EPCS priority access enable response frame 800 according to various embodiments of the present disclosure. As shown in FIG. 8, the frame 800 includes a category field 801, an EHT action field 802, a dialogue token field 803, and a priority access multi-link element field 804.

The category field 801 can carry a value to indicate that this is an extremely high throughput (EHT) action frame/protected EHT action frame. The EHT action field 802 can carry a value to indicate that this is a EPCS priority access enable request frame to be sent for P2P purposes (one of the currently reserved values can be used). The dialogue token field 803 can carry a unique value that can be used as a reference for this frame if another frame is generated as a response to this frame. The priority access multi-link element field 804 can contain the enhanced EDCA parameter set that provides EPCS priority access.

Figure 9:
FIGS. 9 and 10 illustrate message flow diagrams that show examples of EPCS authorization from a non-AP MLD according to various embodiments of the present disclosure.
Figure 9:
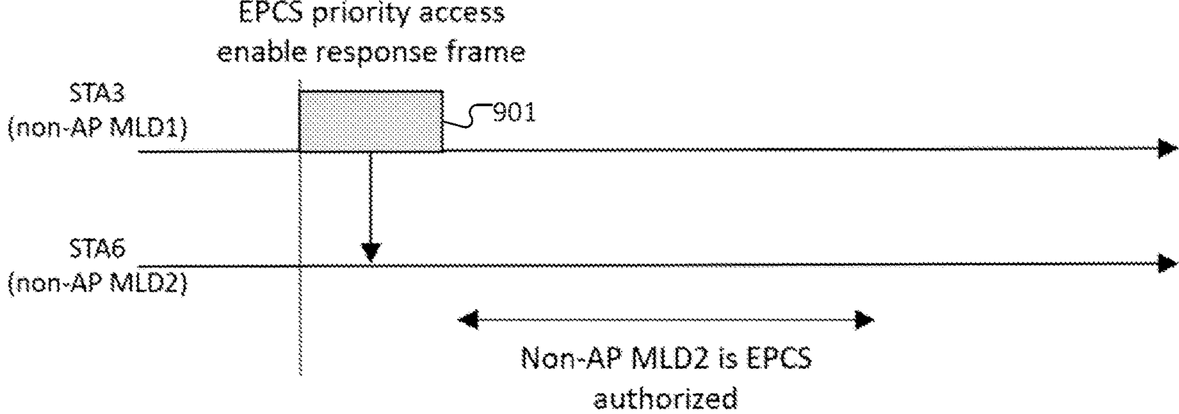

FIG. 9 illustrates a message flow diagram 900 that shows an example of EPCS authorization from a non-AP MLD according to various embodiments of the present disclosure. As shown in FIG. 9, after the non-AP MLD 502 is authorized for EPCS priority access operation, the STA3 (which is affiliated with the non-AP MLD 502) can transmit an EPCS priority access enable response frame 901 to the STA6 (which is affiliated with the non-AP MLD 503). In some embodiments, the EPCS priority access enable response frame 901 can have the format of the EPCS priority access enable response frame 800 of FIG. 8. Upon receiving the EPCS priority access enable response frame 901 from the STA3, the non-AP MLD 503 can set its EPCS access state to enabled and perform channel access with the enhanced EDCA parameter set provided in the Priority access multi-link element.

Figure 10:
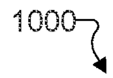
Figure 10:
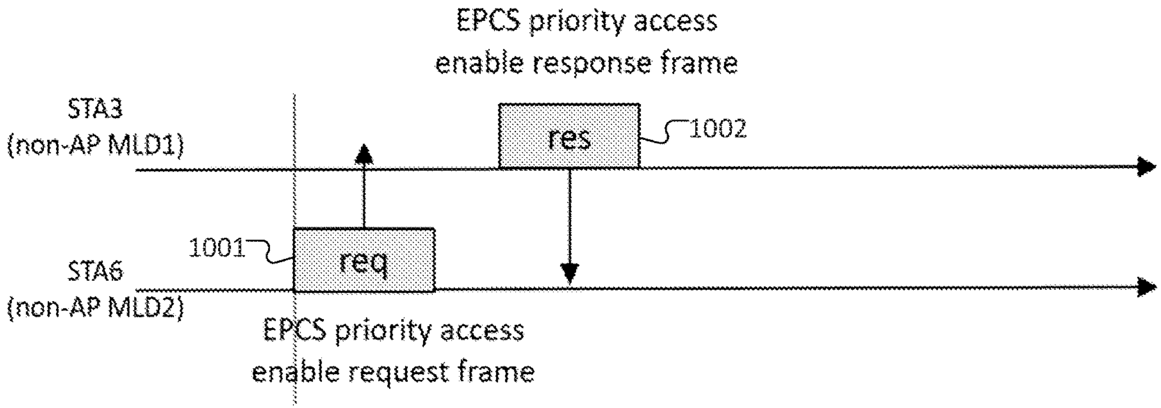

FIG. 10 illustrates a message flow diagram 1000 that shows another example of EPCS authorization from a non-AP MLD according to various embodiments of the present disclosure. As shown in FIG. 10, the non-AP MLD 503 can solicit EPCS priority access by transmitting a EPCS priority access enable request frame 1001 to the non-AP MLD 502. In some embodiments, the EPCS priority access enable request frame 1001 can have the format of the response frame 901 with a different EHT action value to indicate that this is a request frame. Upon receiving the enable request frame 1001, the non-AP MLD 502 can transmit a EPCS priority access enable response frame 1002 to the non-AP MLD 503. Following the reception of the EPCS priority access enable response frame 1002 from the non-AP MLD 502, the non-AP MLD 503 can start to use the enhanced EDCA parameter set for EPCS priority access.

In other embodiments, if the non-AP MLD 503 does not have EPCS authorization on its own, then the non-AP MLD 503 can continue to operate with the non-EPCS EDCA parameter set, and only the non-AP MLD 502 (which has been authorized by AP MLD 501 for EPCS priority access) can continue to benefit from EPCS authorization.

In other embodiments, if a non-AP MLD has been authorized for EPCS priority access, then the AP MLD can generate schedules for Target Wake Time (TWT) (and its variants, such as r-TWT) that are intended only for use by EPCS priority access enabled devices. Accordingly, only devices that have EPCS priority access enabled can join these schedules. In some embodiments, a device that is not a part of an r-TWT schedule can continue to transmit and not terminate its transmission when a r-TWT service period starts before its transmission is completed.

Figure 11:
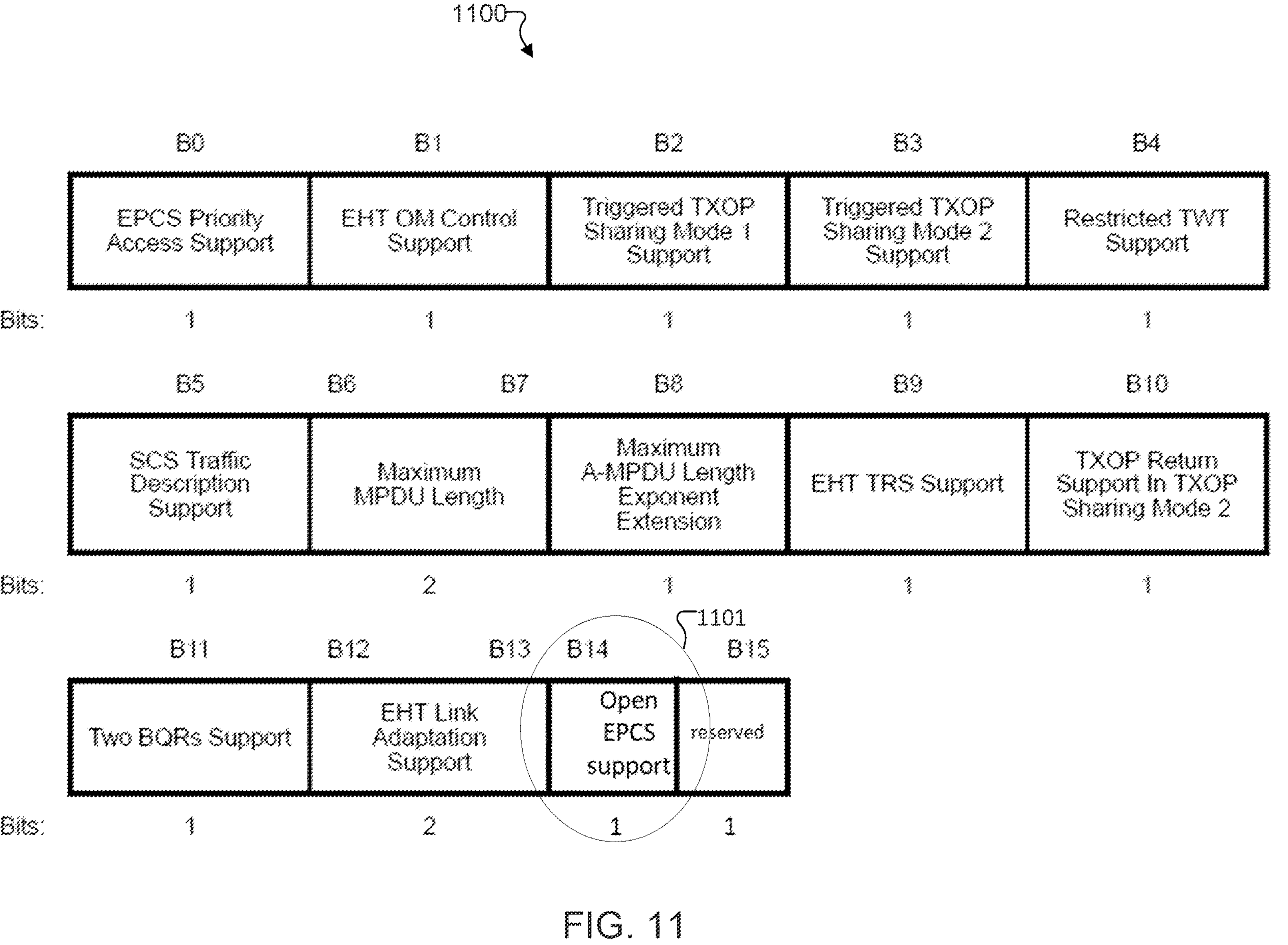
FIG. 11 illustrates an example format of the EHT capabilities information field according to various embodiments of the present disclosure.

According to some embodiments, a device that does not have the authorization to associate with an AP (e.g., because the user does not have a WLAN password or authorization from the service provider) can set up an EPCS priority access connection with the AP. According to these embodiments, an AP that allows such a feature can advertise this capability via the beacon and probe response frame. For example, the EHT MAC capabilities information field in the EHT capabilities element that is advertised can contain an indication using a one bit value in one of the currently reserved bits. FIG. 11 illustrates an example format of the EHT capabilities information field 1100 according to various embodiments of the present disclosure. As shown in FIG. 11, the B14 bit (indicated at 1101) can carry an open EPCS support indication, which can be set to 1 to indicate that the AP supports such a feature, and set to 0 to indicate that the AP does not. In some embodiments, this can also be present as a one bit value in any of the new MAC capabilities element (e.g., UHR MAC capabilities element).

The AP can include a field to indicate that the AP supports devices to set up EPCS priority access even though the devices may not be authorized users of the network. In such a case, a device can transmit an EPCS priority access enable request frame to such an AP even though the device does not have any prior association with the AP. The AP can transmit an EPCS priority access enable response frame to the device. Upon receiving the frame, the device can be authorized to connect with the AP and benefit from EPCS priority access.

Figure 12:
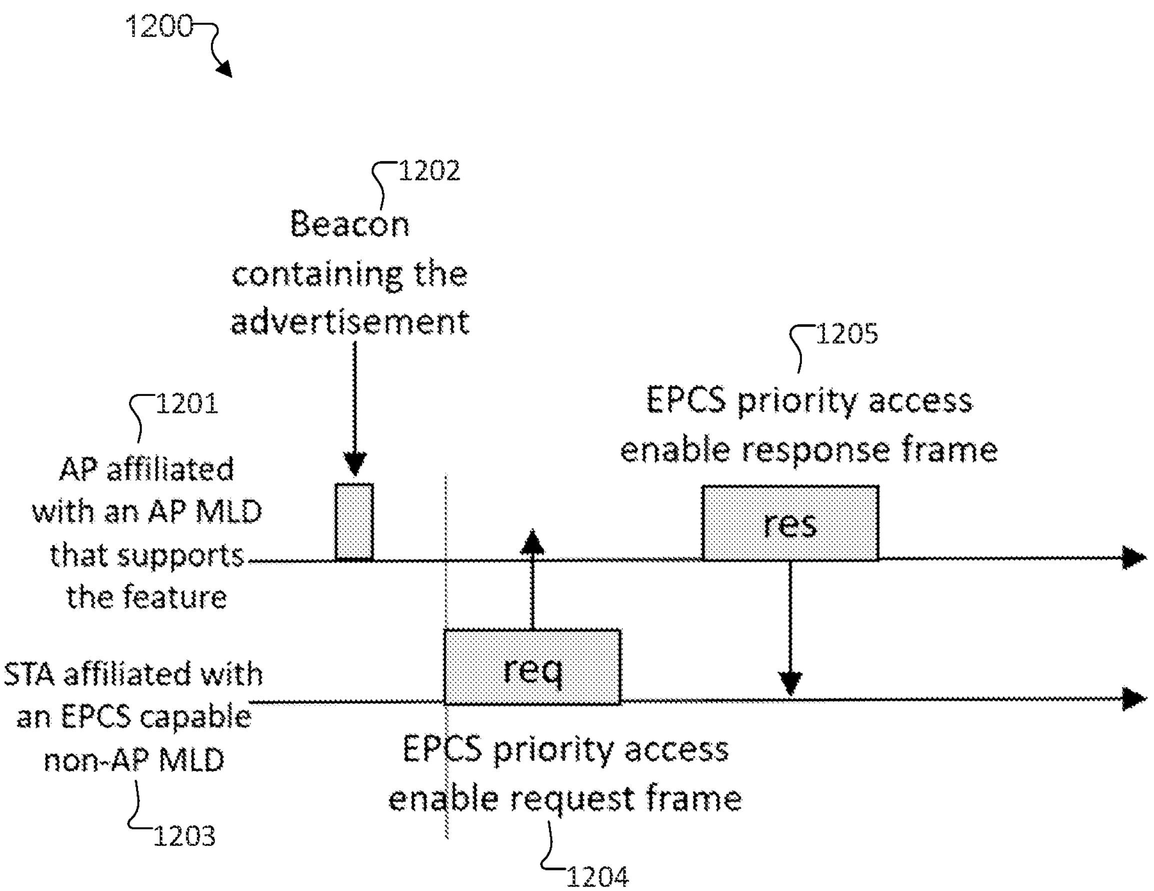
FIG. 12 illustrates a message flow diagram that shows an example of EPCS authorization for a device that is not authorized for the network, according to various embodiments of the present disclosure.

For example, FIG. 12 illustrates a message flow diagram 1200 that shows an example of EPCS authorization for a device that is not authorized for the network, according to various embodiments of the present disclosure. As shown in FIG. 12, an AP affiliated with an AP MLD 1201 that provides EPCS support advertises the support in the EHT capabilities information field carried in the beacon frame 1202. Upon receiving such a beacon from the AP MLD 1201, a STA 1203 that is affiliated with a non-AP MLD can transmit an EPCS priority access enable request frame 1204 to the AP MLD 1201. The AP MLD 1201 can then transmit an EPCS priority access enable response frame 1205. Upon receiving the EPCS priority access enable response frame 1205, the STA 1203 can set the EPCS priority access state to enabled and start using the enhanced EDCA parameter set for its channel access operation.

Although FIGS. 3A through 12 illustrate example techniques for emergency preparedness communication services and related details, various changes may be made to FIGS. 3A through 12. For example, various components in FIGS. 3A through 12 could be combined, further subdivided, or omitted and additional components could be added according to particular needs. In addition, while shown as a series of steps, various operations in FIGS. 3A through 12 could overlap, occur in parallel, occur in a different order, or occur any number of times. In another example, steps may be omitted or replaced by other steps.

Figure 13:
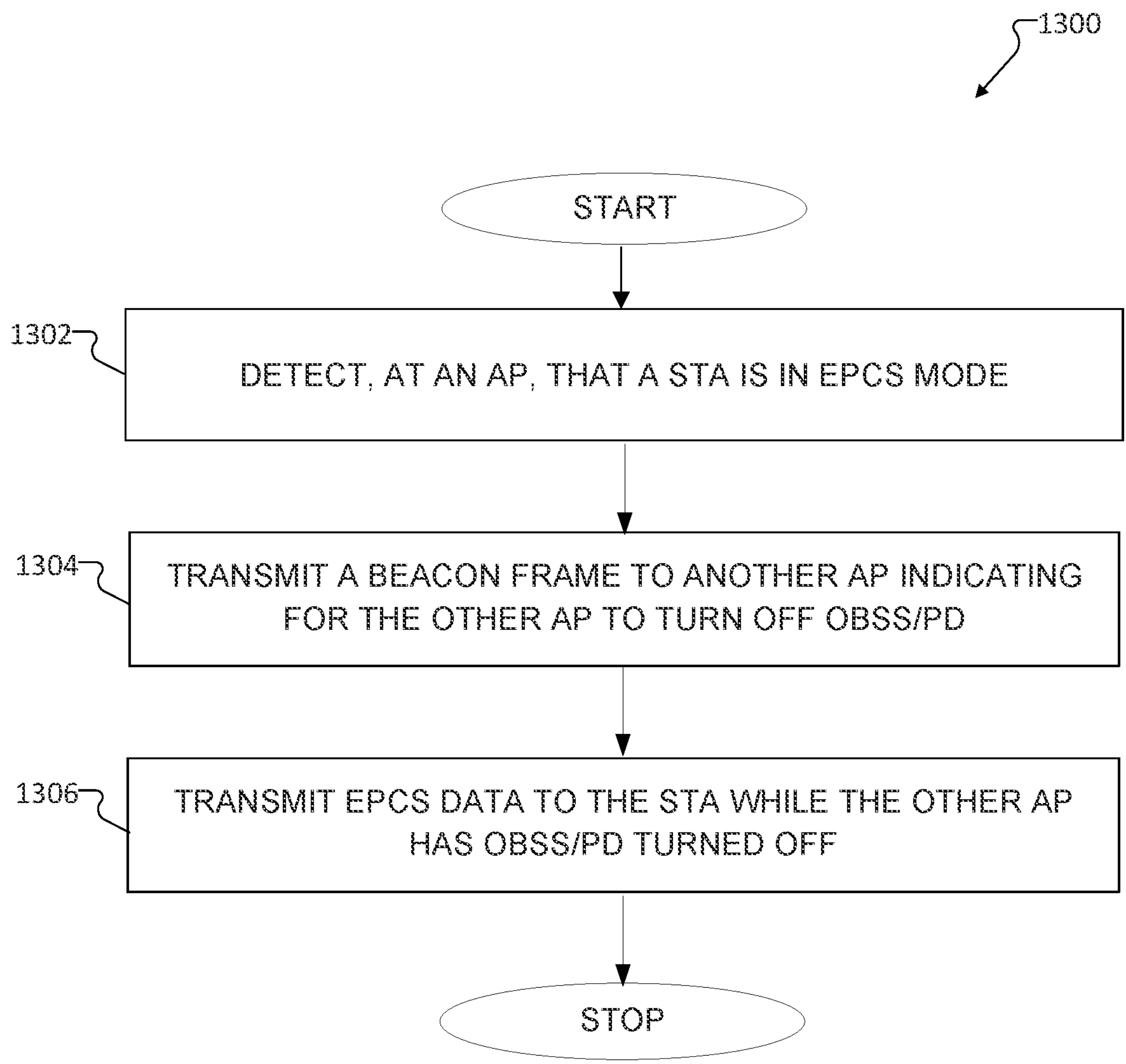
FIG. 13 illustrates a flow chart of a method for emergency preparedness communication services according to various embodiments of the present disclosure.

FIG. 13 illustrates a flow chart of a method 1300 for emergency preparedness communication services according to various embodiments of the present disclosure, as may be performed by one or more components of the system 300 (e.g., the AP 301). The embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

As illustrated in FIG. 13, the method 1300 begins at step 1302. At step 1302, an AP detects that a STA is in an EPCS mode. This could include, for example, the AP 301 detecting that the STA 304 is in an EPCS mode. At step 1304, responsive to detecting that the STA is in the EPCS mode, the AP transmits a beacon frame to another AP. The beacon frame includes a first IE indicating that EPCS is activated for the STA. The beacon frame indicates for the other AP to turn off OBSS/PD. This could include, for example, the AP 301 transmitting a beacon frame 312 to the AP 302, where the beacon frame 312 includes the IE 400. At step 1306, the AP transmits EPCS data to the STA while the other AP has OBSS/PD turned off. This could include, for example, the AP 301 transmitting EPCS data 313 to the STA 304 while the AP 302 has OBSS/PD turned off.

Although FIG. 13 illustrates one example of a method 1300 for emergency preparedness communication services, various changes may be made to FIG. 13. For example, while shown as a series of steps, various steps in FIG. 13 could overlap, occur in parallel, occur in a different order, or occur any number of times.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method, comprising:

detecting, at an access point (AP), that a station (STA) is in an emergency preparedness communication services (EPCS) mode;

responsive to detecting that the STA is in the EPCS mode, transmitting a beacon frame to another AP, wherein the beacon frame includes a first information element (IE) indicating that EPCS is activated for the STA and wherein the beacon frame indicates for the other AP to turn off overlapping basic service set preamble detection (OBSS/PD); and transmitting EPCS data to the STA while the other AP has OBSS/PD turned off.

2. The method of claim 1, wherein the beacon frame further includes a second IE indicating an instruction for neighboring APs to stop OBSS/PD.

3. The method of claim 1, further comprising:

responsive to detecting that the STA is in the EPCS mode, transmitting a second frame to another AP or another STA, wherein the second frame includes a HE-SIG-A field that includes a Spatial_Reuse subfield, and wherein the Spatial_Reuse subfield is set to a value indicating that EPCS is activated for the STA.

4. The method of claim 1, further comprising:

transmitting, by the AP, an unsolicited EPCS priority access enable response frame to the STA, wherein the unsolicited EPCS priority access enable response frame includes a third IE indicating that EPCS is authorized by the AP;

receiving, from a second STA, an EPCS priority access enable request frame, wherein the second STA is a peer device of the STA; and transmitting an EPCS priority access enable response frame to the second STA in response to the EPCS priority access enable request frame.

5. The method of claim 4, wherein the STA and the second STA are configured to communicate over a peer-to-peer (P2P) link.

6. The method of claim 5, wherein:

the STA and the second STA are affiliated with different multi-link devices (MLDs), and the P2P link comprises a Tunneled Direct Link Setup (TDLS) link between the MLDs.

7. The method of claim 1, further comprising:

generating, by the AP, a Target Wake Time (TWT) schedule for use by the STA while EPCS is activated for the STA.

8. The method of claim 1, further comprising:

transmitting, by the AP, a second beacon frame that includes a fourth IE indicating open support for EPCS for non-authorized devices;

receiving an EPCS priority access enable request frame from a third STA that does not have prior authorization to connect to the AP; and transmitting an EPCS priority access enable response frame to the third STA.

9. The method of claim 8, wherein the fourth IE occupies an information field in the second beacon frame that was previously defined as reserved.

10. A device comprising:

a transceiver; and a processor operably connected to the transceiver, the processor configured to:

detect, at an access point (AP), that a station (STA) is in an emergency preparedness communication services (EPCS) mode;

responsive to detecting that the STA is in the EPCS mode, control the transceiver to transmit a beacon frame to another AP, wherein the beacon frame includes a first information element (IE) indicating that EPCS is activated for the STA and wherein the beacon frame indicates for the other AP to turn off overlapping basic service set preamble detection (OBSS/PD); and control the transceiver to transmit EPCS data to the STA while the other AP has OBSS/PD turned off.

11. The device of claim 10, wherein the beacon frame further includes a second IE indicating an instruction for neighboring APs to stop OBSS/PD.

12. The device of claim 10, wherein the processor is further configured to:

responsive to detecting that the STA is in the EPCS mode, control the transceiver to transmit a second frame to another AP or another STA, wherein the second frame includes a HE-SIG-A field that includes a Spatial_Reuse subfield, and wherein the Spatial_Reuse subfield is set to a value indicating that EPCS is activated for the STA.

13. The device of claim 10, wherein the processor is further configured to:

control the transceiver to transmit an unsolicited EPCS priority access enable response frame to the STA, wherein the unsolicited EPCS priority access enable response frame includes a third IE indicating that EPCS is authorized by the AP;

receive, from a second STA, an EPCS priority access enable request frame, wherein the second STA is a peer device of the STA; and control the transceiver to transmit an EPCS priority access enable response frame to the second STA in response to the EPCS priority access enable request frame.

14. The device of claim 13, wherein the STA and the second STA are configured to communicate over a peer-to-peer (P2P) link.

15. The device of claim 14, wherein:

the STA and the second STA are affiliated with different multi-link devices (MLDs), and the P2P link comprises a Tunneled Direct Link Setup (TDLS) link between the MLDs.

16. The device of claim 10, further comprising:

generating, by the AP, a Target Wake Time (TWT) schedule for use by the STA while EPCS is activated for the STA.

17. The device of claim 10, wherein the processor is further configured to:

control the transceiver to transmit a second beacon frame that includes a fourth IE indicating open support for EPCS for non-authorized devices;

receive an EPCS priority access enable request frame from a third STA that does not have prior authorization to connect to the AP; and control the transceiver to transmit an EPCS priority access enable response frame to the third STA.

18. The device of claim 17, wherein the fourth IE occupies an information field in the second beacon frame that was previously defined as reserved.

* * * * *